United States Patent [19]
Murphy, Jr.

[11] 4,221,208
[45] Sep. 9, 1980

[54] SOLAR COLLECTOR ASSEMBLY

[76] Inventor: John A. Murphy, Jr., 7273 N. Central Ave., Phoenix, Ariz. 85020

[21] Appl. No.: 964,405

[22] Filed: Nov. 28, 1978

Related U.S. Application Data

[63] Continuation-in-part of Ser. No. 911,572, Jun. 1, 1978, abandoned, and a continuation-in-part of Ser. No. 827,417, Aug. 24, 1977, Pat. No. 4,111,188, and a continuation-in-part of Ser. No. 712,291, Aug. 6, 1976, abandoned.

[51] Int. Cl.³ .................................................. F24J 3/02
[52] U.S. Cl. ................................. 126/432; 126/446; 126/450; 126/DIG. 2
[58] Field of Search ............... 126/270, 271, 446, 450, 126/DIG. 2, 432; 237/1 A; 165/49, 65, 86; 52/533, 518, 543, 553

[56] References Cited

U.S. PATENT DOCUMENTS

| 3,384,167 | 5/1968 | Javin | 165/171 |
| 3,707,821 | 1/1973 | Leddy | 52/748 |
| 4,083,360 | 4/1978 | Courvoisier et al. | 126/271 |
| 4,111,188 | 9/1978 | Murphy, Jr. | 126/271 |

FOREIGN PATENT DOCUMENTS

| 2309307 | 8/1974 | Fed. Rep. of Germany | 126/271 |
| 2330974 | 6/1977 | France | 126/447 |

Primary Examiner—James C. Yeung
Attorney, Agent, or Firm—Sughrue, Rothwell, Mion, Zinn and Macpeak

[57] ABSTRACT

A solar collector assembly includes shingles which have integral tubes projecting therefrom, and which are mounted in overlapping parallel array. Mounting brackets for the shingles are engaged on roof rafters or the like, and interlocked light transmissive plates overlie the shingles. The plates are also engaged with shingle components. A special fitting for the tube ends is provided.

7 Claims, 5 Drawing Figures

SOLAR COLLECTOR ASSEMBLY

CROSS REFERENCE TO RELATED APPLICATIONS:

This application is a continuation-in-part of my prior application Ser. No. 712,291, filed Aug. 6, 1976 now abandoned, and my prior copending applications Ser. No. 827,417, filed Aug. 24, 1977, now U.S. Pat. No. 4,111,188, and Ser. No. 911,572, filed June 1, 1978, now abandoned.

BACKGROUND OF THE INVENTION

1. Field of the Invention:

This invention pertains to a metallic roof structure with an overlying series of light transmissive plates which collectively form a solar collector.

2. Statement of the Prior Art:

Prior developments in this field are shown, by way of general illustration, in the below listed patents:

| Patentee | U.S. Pat. No. | Issue Date |
|---|---|---|
| Eaton | 1,802,635 | Apr. 28, 1931 |
| Scott | 2,311,579 | Feb. 16, 1943 |
| Swanton, Jr. | 2,544,474 | Mar. 6, 1951 |
| Stockstill | 2,594,232 | Apr. 22, 1952 |
| Harris | 2,625,930 | Jan. 20, 1953 |
| Lof | 2,680,565 | Jun. 8, 1954 |
| Rostock | 2,705,948 | Apr. 12, 1955 |
| Brunton | 3,001,331 | Sep. 26, 1961 |
| Lappala et al | 3,006,818 | Oct. 31, 1961 |
| Bargues | 3,194,228 | Jul. 13, 1965 |
| Thomason | 3,254,643 | Jun. 7, 1966 |
| Hervey | 3,262,493 | Jul. 26, 1966 |
| Thomason | 3,369,539 | Feb. 20, 1968 |
| Snelling | 3,390,672 | Jul. 2, 1968 |
| Harris, Jr. | 3,620,206 | Nov. 16, 1971 |
| Gaydos, Jr. | 3,815,574 | Jun. 11, 1974 |
| Salvail | 3,847,136 | Nov. 12, 1974 |
| Frank | 3,975,926 | Apr. 8, 1975 |
| Stout et al | 3,918,430 | Nov. 11, 1975 |

SUMMARY OF THE INVENTION

The invention hereof provides a solar collector assembly in which a series of shingles and light transmissive plates are interengaged in a continuous array on a roof or building side. The shingles have tubes thereon which provide fluid conduits for a heat transfer medium in liquid or fluid form. The tubes are provided with end fittings for use in connecting the tubes to an end use device. The invention constitutes a roof or siding with inherent structural capability.

The plates are formed of a material which transmits sunlight, but does not permit passage of infrared rays therethrough, and are maintained in outwardly spaced relationship to the shingles, thereby providing an insulating space over the area of heat collection.

The fitting employed herein serves to avoid leakage through incorporation therein of a series of outwardly flared portions which provide a fluid seal. These fittings are attached to the tube ends and may be connected by conventional fluid transfer means to the end use device.

The improvements hereof facilitate installation of the collector and result in decreased costs. The heat transmitted to the collector is transferred to storage or delivery areas by fluid or gas.

The collector hereof also possesses the ability to collect heat by passing air across the collector from the eave to the crest of a roof through the air space between the lower surface of the collector and the top surface of the insulation placed below the collector. The amount of space between these surfaces is variable in accordance with the distance which the installation is placed from the collection, and thus, the collector can function both in a fluid and air capacity.

Other and further objects and advantages of the invention will become apparent to those skilled in the art from a consideration of the following specification when read in conjunction with the annexed drawings.

DESCRIPTION OF THE PREFERRED EMBODIMENT

Figure 1:
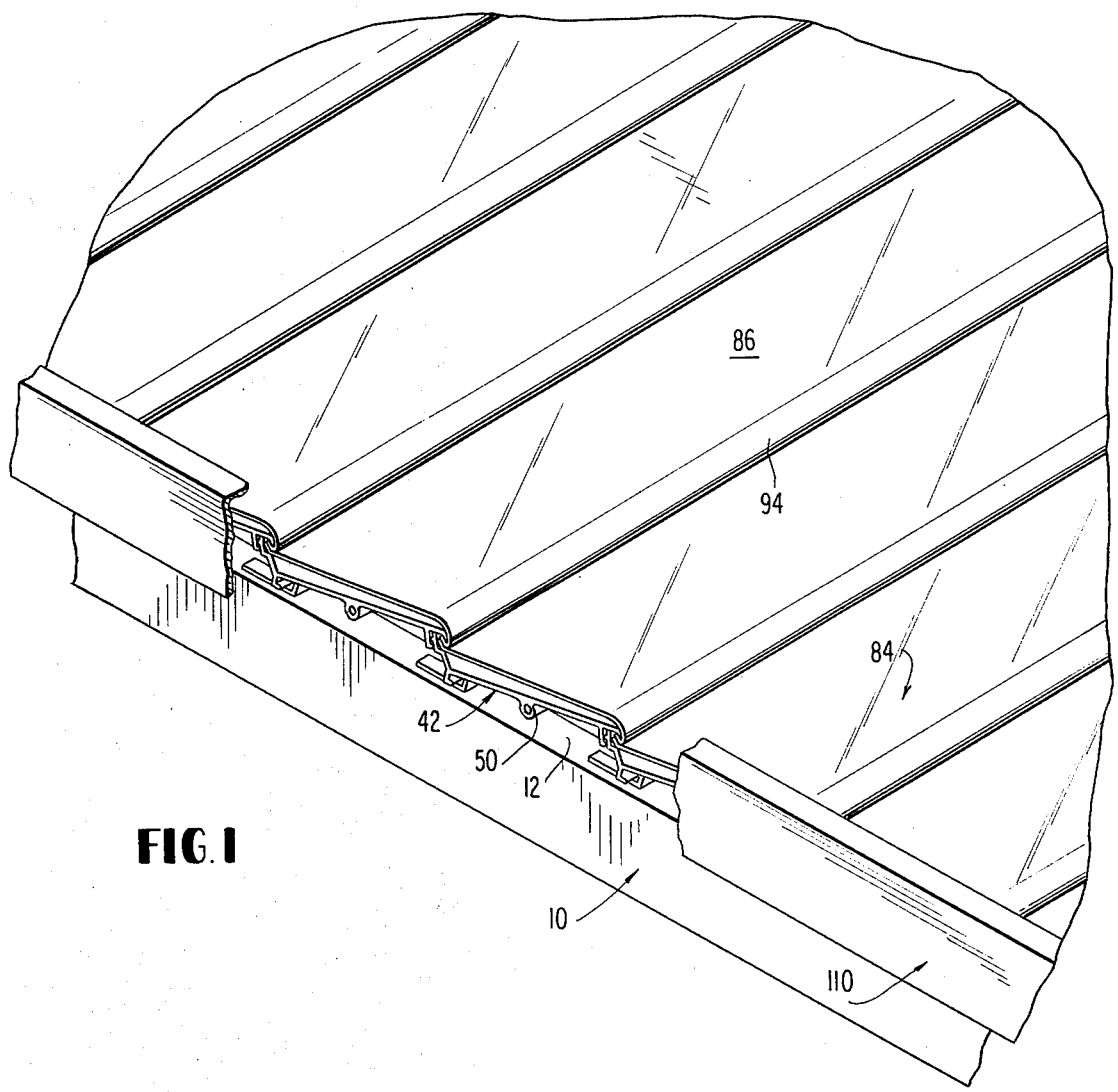
FIG. 1 is an end perspective view of a portion of a solar collector assembly hereof, with a section broken away for disclosure of details.

Referring to the drawings in more detail, a building has a plurality of spaced apart rafters or studs 10 each including a top surface 12. While only a single rafter 10 is shown in the drawings, it will be understood that a continuous series of them are included. The rafters or studs form an open framework which in conventional construction is covered by plywood, composition board, or the like and to which finish materials are subsequently applied. In lieu of such conventional construction, the present invention contemplates the application of the collector assembly hereof directly to the rafters or studs.

The assembly includes a plurality of brackets 14 each comprising an elongated plate 16 having opposite ends 18 and 20, and a base wall 17. Projecting from the base wall 17 are a pair of fore and aft barbs 19 (FIG. 2) which function to prevent twisting of the bracket by engagement in the rafter 10 as shown. A vertical wall 22 is located at the end 20, and has a lip 24 extending inwardly. Spaced forwardly from the vertical wall 22 is a second upstanding wall 26 which has a horizontal top foot member 28 extending toward the lip 24. The foot member is recessed at 20, and a plastic insert 32 of the type shown in the aforesaid applicaton Ser. No. 827,417 is seated therein. Such insert includes a base 34 and a front wall 36 which abuts the vertical wall 22. A retaining lip 38 underlies the lip 24, and an upright wall 40 extends from the base inwardly forward of the top foot member 28 of the bracket.

The shingles 42 hereof have elongated, flat main shingle portions 44 with opposite upper and lower surfaces 46 and 48. A tube or pipe 50, preferably formed as an integral extrusion with the portion 44 is fixedly secured to one of the surfaces and has an open bore 52 extending fully from end-to-end thereof.

The shingle 42 further includes an upper edge 54 and a lower edge 56. Depending from the lower surface 46 adjacent but spaced inwardly from the edge 56 is a vertical projection 58 having a bead 60. Also depending from the surface 46 at the edge 56 is a curved projection 62 having a bead 64 at its lower terminal end which faces in the direction of the vertical projection 58. The projections 58 and 62 define a diverging channel 66 therebetween serving a function appearing in more detail below.

At the upper edge 54 of the shingle is an outwardly directed projection 68 with a shelf 70 having a terminal projection 72 and having a continuous ridge 74. Depending from the edge 54 immediately below the outward projection 68 is an L shaped flange 76 with a leg member 78 and an inwardly extending foot member 80.

Figure 2:
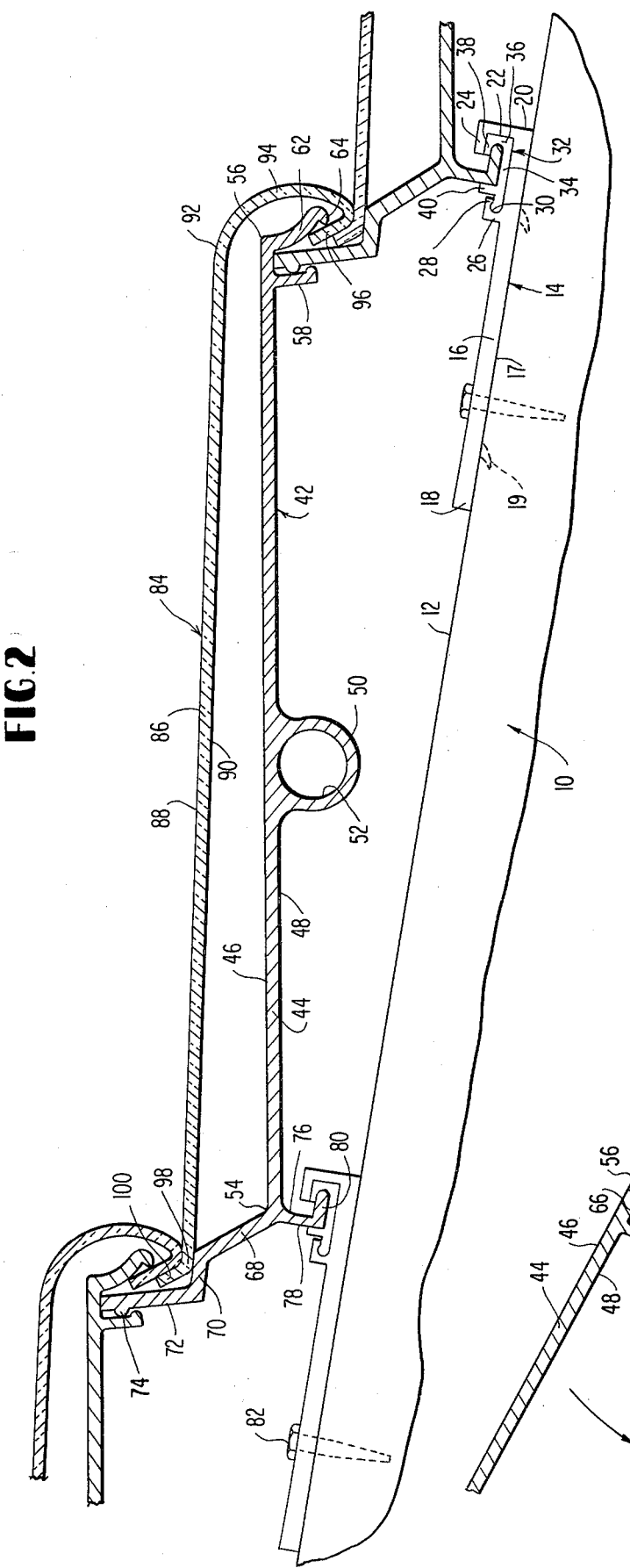
FIG. 2 is an enlarged sectional view.
Figure 3:
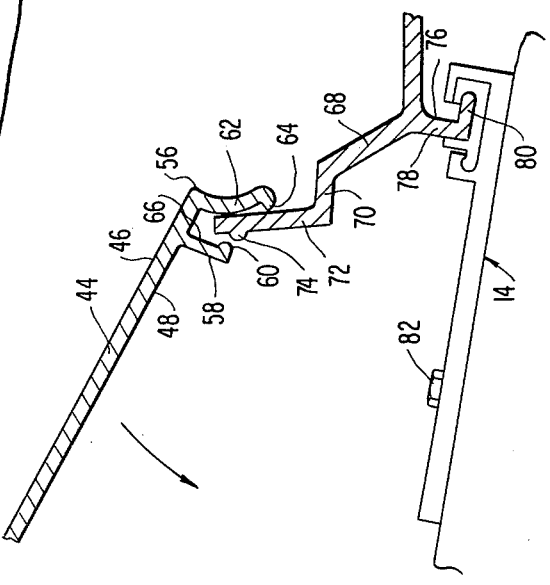
FIG. 3 is a sectional view illustrating application of a shingle to a previously positioned one thereof.

As illustrated in FIGS. 2 and 3, the brackets 14 are mounted on the rafters 10 in selected, spaced array by fasteners 82 such as nails or screws. The brackets are in longitudinal rows for connection of the shingles in continuous rows along the rafters. The vertical spacing of the brackets is such that the L shaped flanges 76 seat in the plastic inserts 32 with the foot members 80 partially underlying the retaining lips 38 and the leg members 78 against the walls 40. The next adjacent shingle is then connected to a preceding shingle by placing the projections 58 and 62 of the former over the terminal projections 72 of the latter, the projection 72 entering the diverging channel 66.

In the present embodiment, the light transmissive plates of the invention are identified generally in the drawings by reference character 84. Each includes a main plate portion 86 having an outer surface 88 and an inner surface 90. At the leading edge 92 of the plate it has a rounded forward panel 94 with a reverted lip 96. On the trailing edge 98 is an upwardly angled strip 100. These panels, in addition to the functions of enhancing the heat gathering of the assembly and of insulating the shingles from loss of heat to ambient atmosphere, also provide for interengagement of the components. In regard to the latter, the lips 96 engage between the angle strips 100 and the beads 64 of the projections 62 so that the entire unit is effectively locked together.

Figure 4:
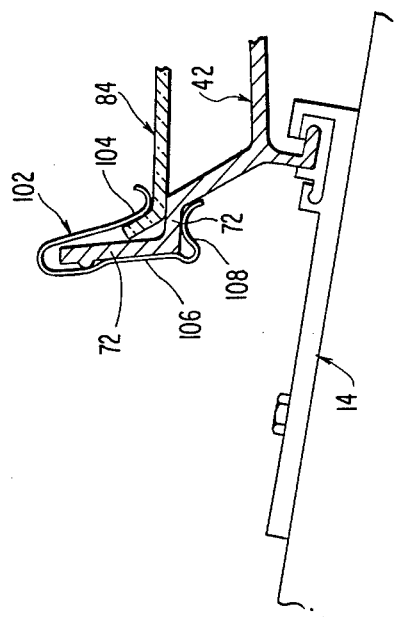
FIG. 4 is a sectional view showing an end clip hereof.

It will be understood that a starting block (not shown) formed according to the particular installation requirements will be provided. In FIG. 4, a top of the assembly is shown wherein the last succeeding shingle 42 is engaged in a last bracket 14, with a panel 84 in place. Since there is no additional shingle or panel to hold them in place, a spring clip 102 is provided. The clip 102 has a front arm 104 which bears against the angle strip 100 of the panel 84, and a rear arm 106 engaged tensionally against the terminal projection 72, and a curvilinear lower arm 108 engaged under the shelf 70.

The sides of the assembly are closed by a channel member 110 or the like.

Figure 5:
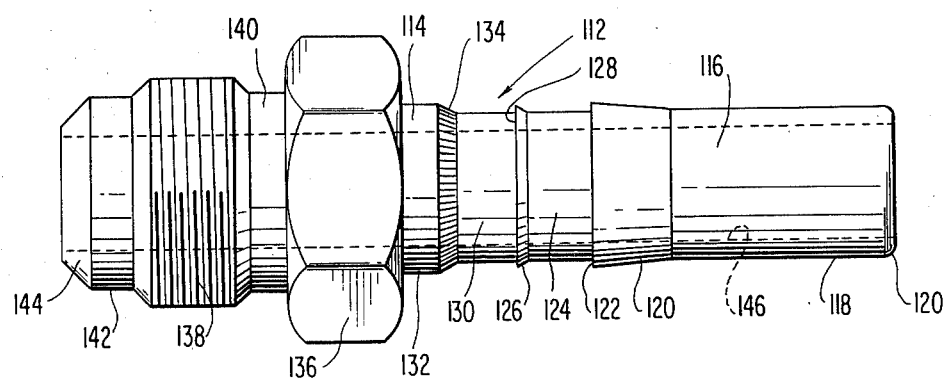
FIG. 5 is a side elevational view of the tube and fitting.

At the ends of each of the tubes 50 is a fitting 112, shown in FIG. 5. The fitting comprises an elongaged body portion 114 having an insert section 116. The insert section has a tube 118 with a beveled outer end 120, the tube 118 being of an outside diameter to fit tightly within the bore 52. A flared section 120 terminating in a shoulder 122 precedes another tubular section 125, the flared section expanding the tube 50 as it enters the bore. A skirt 126 of a diameter substantially equal to the maximum diameter of the section 120 terminates at a second shoulder 128, and is followed by a third tube section 130. An externally knurled portion 132 which functions to prevent twisting following application, has a slant entry wall 134 and is adapted to seat tightly in the tube end. An integral nut 136 is provided for tool engagement, and is separated from an externally threaded sleeve 138 by a reduced portion 140. An entry collar 142 has a beveled leading edge 144. A bore 146 extends the full length of the body porton 114. Thus, with the secton 132 inserted fully into the tube end, a fluid tight fitting is provided to allow for flow of the heat transfer medium to an end use device through the connection of other fittings to the third sleeve 138.

What is claimed is:

1. An extruded metal solar collector shingle for mounting in multiple shingle, edge overlapping, parallel array fashion on laterally spaced rafters of a building structure or the like, said shingle comprising:

an elongated planar sheet portion, having upper and lower surfaces and laterally opposed upper and lower edges, said upper surfaces facing away from the building;

fluid conduit means integral with and engaged on one of the surfaces of the sheet portion;

interlocking means along opposed lateral edges of said sheet portion comprising upward projections on the upper edges of the sheet portion, channels defined by depending projections on the lower edges of the sheet portion and an L-shaped flange having an inwardly extending foot depending from the upper edge of the sheet portion, said depending projections engaging over the upward projections for forming a mechanical interlocking connection between overlapping edges of respective sheet portions of adjacent shingles; and light transmissive plates having leading and trailing edges and means engaging said edges in interlocking relationship with said interlocking means such that said plates are securely locked to and spaced from said sheet portion.

2. The invention of claim 1, and:

bracket means on the rafters comprising spaced-apart vertical walls having lip and horizontal foot members and barbs for engaging the rafters.

3. The invention of claim 2 wherein:

the L-shaped flanges of the interlocking means engage the lip and horizontal foot members of said bracket means.

4. The invention of claim 1 and:

said engaging means of the light transmissive plates comprising a rounded forward panel with a reverted lip on the leading edge of said plates and an upward angle strip on the trailing edge thereof;

said reverted lip and angle strip of said leading and trailing edges securely locked together between said channels and said upward projections; and said light transmissive plates spaced from said sheet portions thereby providing an insulating space between said sheet portion and said light transmissive plates.

5. A solar collector assembly for mounting on a building frame having laterally spaced rafters, comprising:

a plurality of brackets arranged in laterally aligned rows along the rafters, each bracket including spaced apart, upstanding walls with lip members thereon;

a plastic insert in each bracket engaged therein by said lips, the inserts having entry portions and retaining lips;

a plurality of shingles for mounting in multiple shingle, edge overlapping array on said rafters, the shingles each including elongated shingle portions with upper and lower surfaces;

an integrally extruded tube on the lower surface of each of the shingles, said tubes extending the full lengths of the shingles and having open ends;

the shingles having upper and lower edges, and having L-shape flanges depending from the upper edges and engaged in the bracket inserts;

upward projections on the upper edges of the shingles, and depending projections defining channels on the lower edges, the depending projections engaging over the upward projection of successive shingles, the upward projections seating in the channels; and a series of light transmissive plates having leading and trailing sections, with curvilinear lips on the leading sections engaged within the channels, and angle strips on the trailing sections clamped between the curved lip and the upward projection of succeeding shingles and plates.

6. The invention of claim 5, and:

a terminal clip for the last shingle and bracket of a series thereof engaging the angle strip of the plate against the upward projection.

7. The invention of claim 5, and:

a fitting for each of the tube ends comprising a body portion having an insert section;

the insert section having a plurality of flared portions to expand the tube upon entry therein, and having a knurled engagement portion which seats in said end; and a tool engagement section, and an externally threaded connector.

* * * * *